Jan. 31, 1939.  S. BERGSTEIN  2,145,682
MECHANISM AND METHOD FOR REINFORCING ONE-PIECE BOXES
Filed Feb. 11, 1938  6 Sheets-Sheet 1
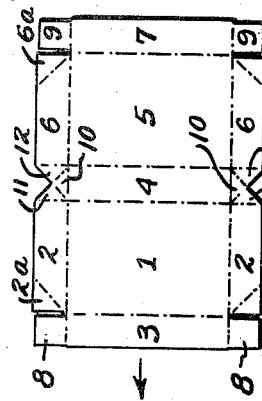
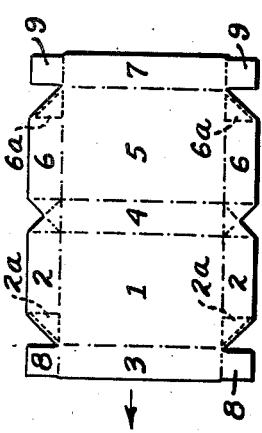
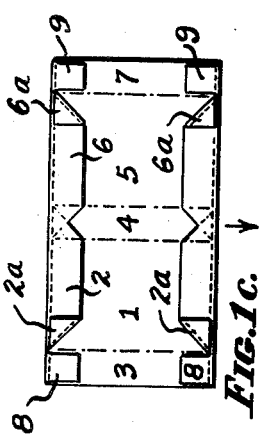
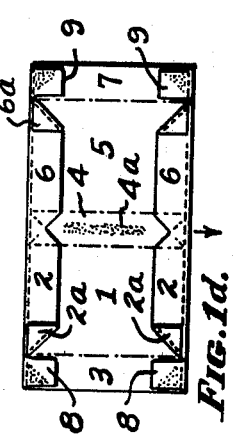
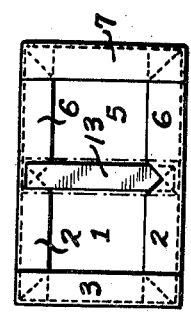
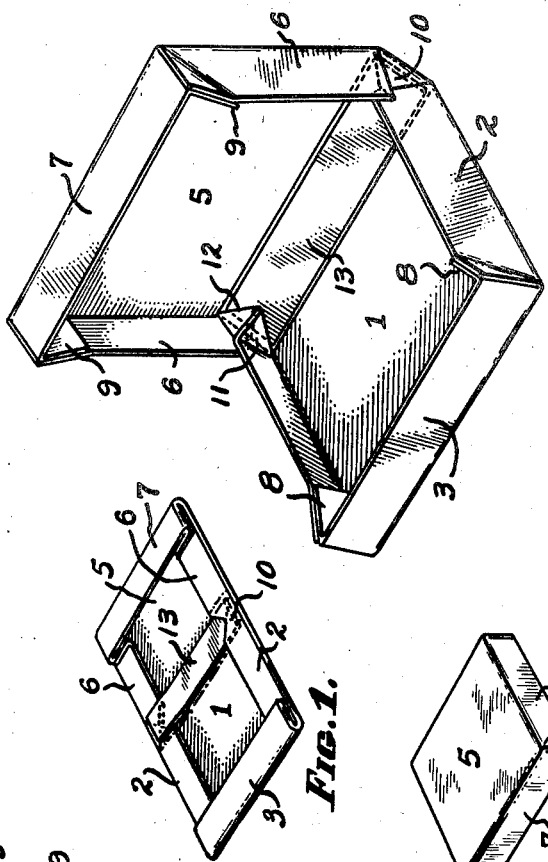
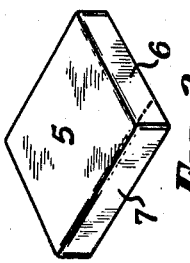
INVENTOR.
SAMUEL BERGSTEIN.
BY
Allen & Allen
ATTORNEYS.

Jan. 31, 1939. S. BERGSTEIN 2,145,682
MECHANISM AND METHOD FOR REINFORCING ONE-PIECE BOXES
Filed Feb. 11, 1938 6 Sheets-Sheet 2
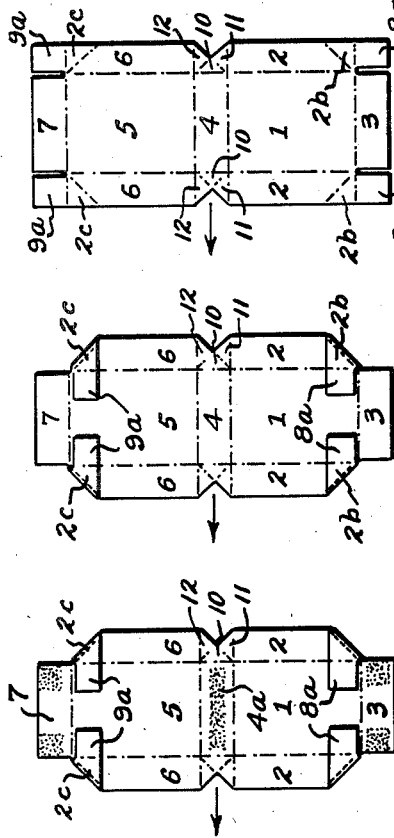
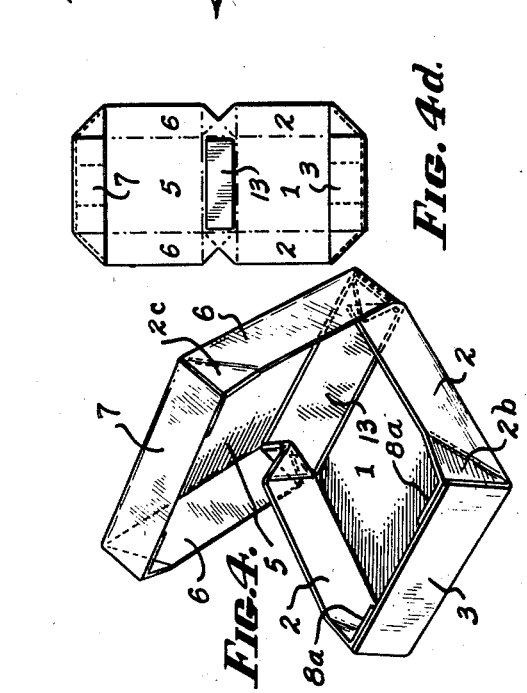
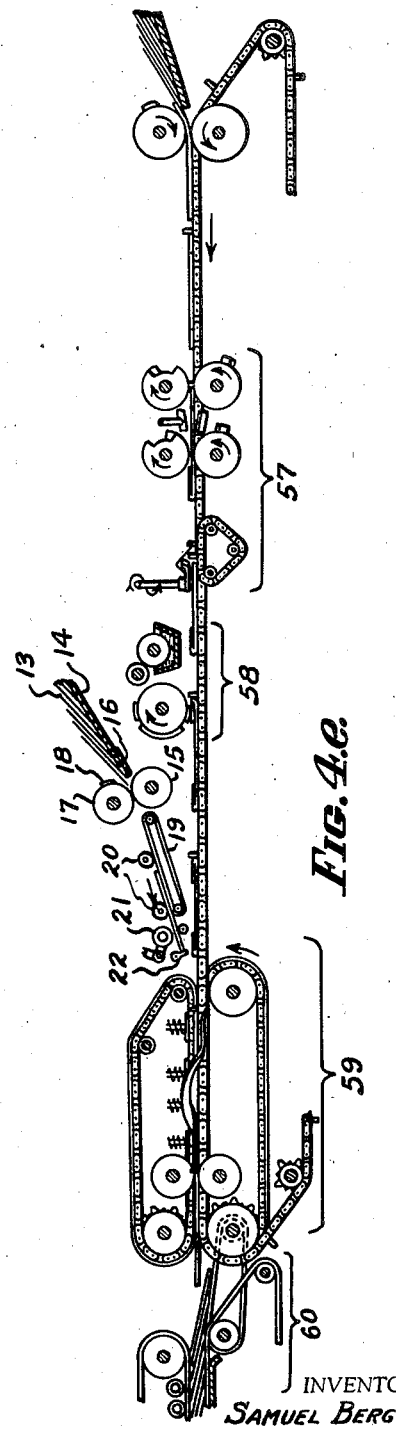
INVENTOR.
SAMUEL BERGSTEIN.
Allen & Allen
ATTORNEYS.

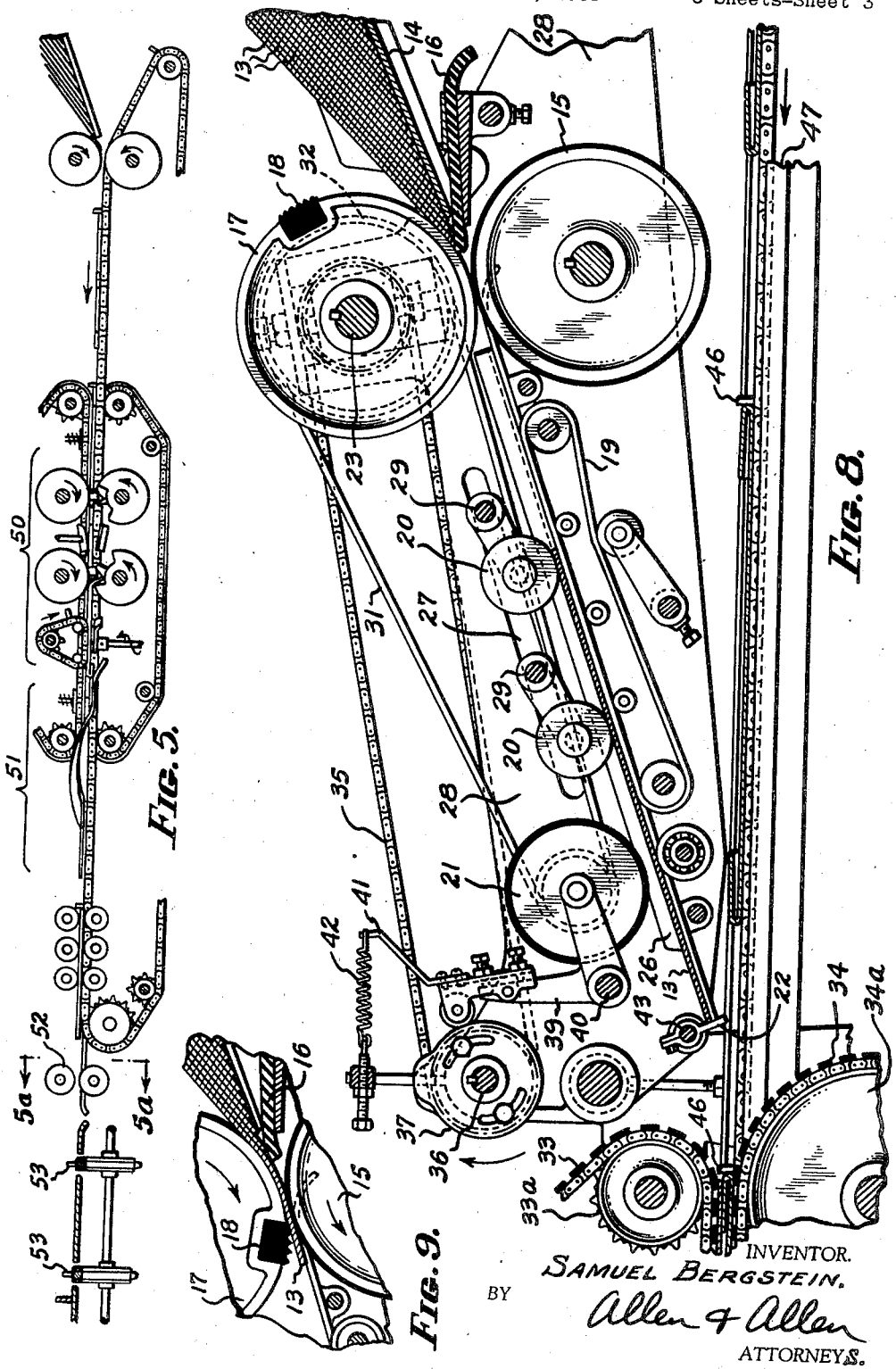

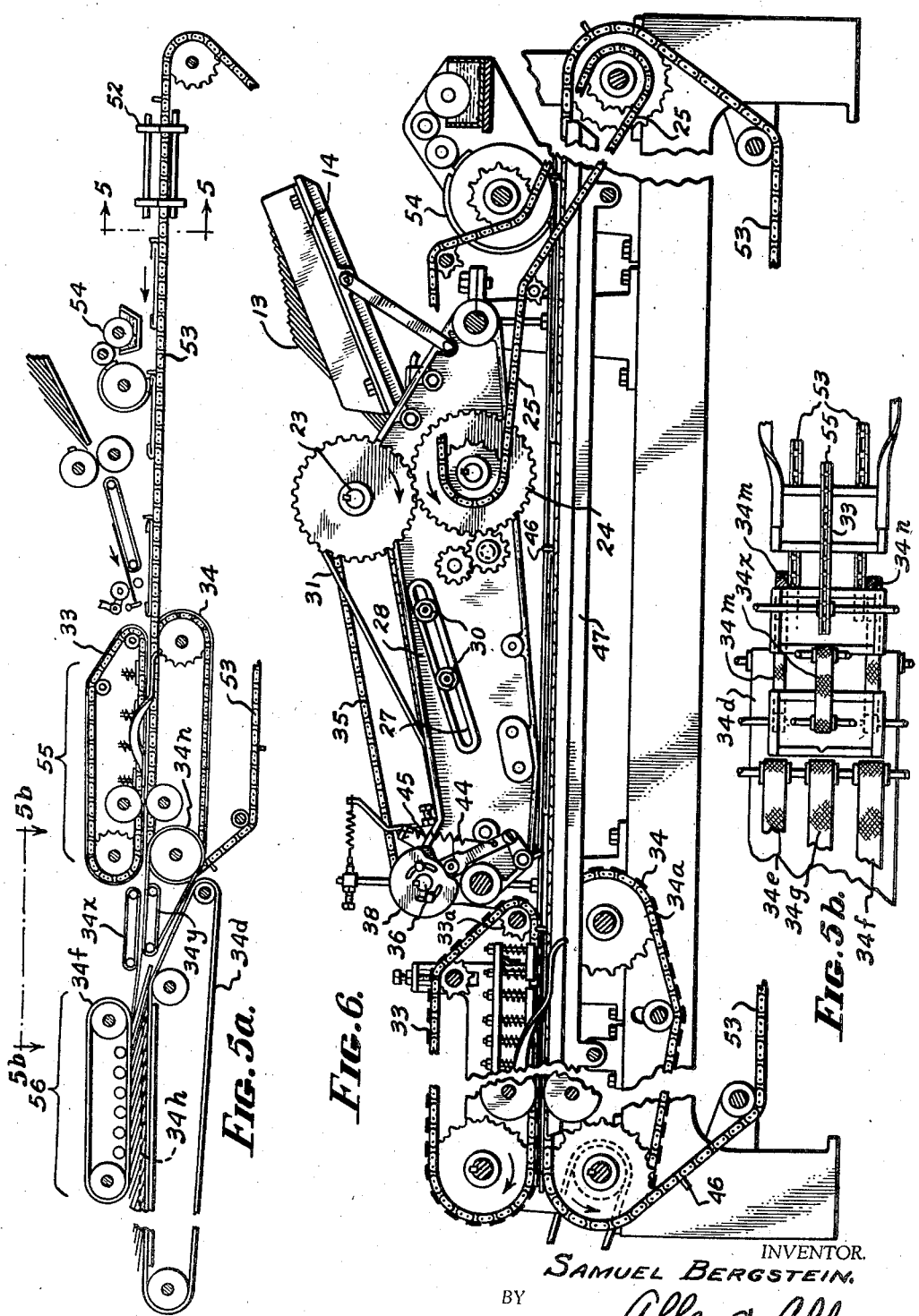

Jan. 31, 1939.　　　　　S. BERGSTEIN　　　　　2,145,682
MECHANISM AND METHOD FOR REINFORCING ONE-PIECE BOXES
Filed Feb. 11, 1938　　　6 Sheets-Sheet 5

INVENTOR.
SAMUEL BERGSTEIN.
BY Allen & Allen
ATTORNEYS.

Jan. 31, 1939.   S. BERGSTEIN   2,145,682
MECHANISM AND METHOD FOR REINFORCING ONE-PIECE BOXES
Filed Feb. 11, 1938   6 Sheets—Sheet 6

INVENTOR.
SAMUEL BERGSTEIN.
BY
Allen & Allen
ATTORNEYS.

Patented Jan. 31, 1939

2,145,682

UNITED STATES PATENT OFFICE 2,145,682

MECHANISM AND METHOD FOR REINFORCING ONE-PIECE BOXES

Samuel Bergstein, Cincinnati, Ohio, assignor to Edna May Bergstein and Robert Morris Bergstein, trustees, Cincinnati, Ohio Application February 11, 1938, Serial No. 190,079

28 Claims. (Cl. 93—36)

My invention relates to a one-piece type of box with cover attached, which can be shipped flat or in knocked-down form, and can be erected readily for packing by the user. It is an object of my invention to produce a box of the character noted, which will provide both a bottom and lid having front and side walls, said walls being joined at corners where they meet, the back wall having at its lateral edges intermediate corner connecting sections between the side walls of both the bottom and the lid, and the back wall reinforced over a substantial portion of its area.

In a one-piece box with lid attached, as the type described above, with the lid the same depth as the bottom, it is obvious that when the box is erected and the lid is brought into closing position, that there are two full depth walls at the front and two sides of the erected box, and the back wall, being a single thickness, is weak, unless some special provisions are made for reinforcing this back wall. To overcome this difficulty, separate strips of cardboard or other semi-rigid material have been adhered to the interior surface of the back wall, but this always has been a slow and costly hand operation. By my invention as herein described I not only provide a method of reinforcing the walls of one-piece boxes by a high-speed continuous operation, but also provide a method of accomplishing this as part of a continuous series of operations which include a folding and gluing of the box blank itself, thereby producing a reinforced wall box at no additional manufacturing cost or labor as compared to a non-reinforced wall box.

My invention is adapted for use in structures as disclosed in my co-pending application Serial No. 167,788, filed October 7, 1937, and can be used in connection with machines as described in my co-pending application Serial No. 129,900, filed March 9, 1937, and an conjunction with the mechanism and method described in my Patent Number 1,926,364 issued September 12, 1933, and Number 1,974,408 issued September 25, 1934.

Referring now to the drawings:

Figure 1 is a perspective of my preferred type of box, in knocked-down form ready for shipment.

Figs. 1a to 1f, inclusive, illustrate successive stages of manufacture, and the initial and secondary directions of movement imparted to the blank.

Fig. 2 is an enlarged perspective showing the box in a semi-erected position.

Fig. 3 is a perspective of the closed box.

Fig. 4 is a perspective of an alternate style of box, partly erected.

Figs. 4a to 4d, inclusive, illustrate successive stages in the manufacture of the box of Fig. 4.

Fig. 4e is a diagrammatic side elevation of my machine for forming the box of Fig. 4.

Fig. 5 is a diagrammatic side elevation showing the conveyor and apparatus used in the initial direction of movement for forming the box of Fig. 1. At the left end of this figure part of the secondary conveyor is shown in section, the plane of this portion being taken along the line 5—5 of Fig. 5a.

Fig. 5a is a diagrammatic side elevation showing the conveyor and apparatus used in the secondary direction of travel. The relation of this mechanism to that of Fig. 5 is indicated by the line 5a—5a of Fig. 5.

Fig. 5b is a diagrammatic plan view taken along the line 5b—5b of Fig. 5a.

Fig. 6 is a detailed side elevation of my device for applying the reinforcing strip. This mechanism is here shown in conjunction with apparatus adapted for gluing and folding box blanks, said apparatus being shown in conventional sectional elevation, with parts broken away.

Figure 7:
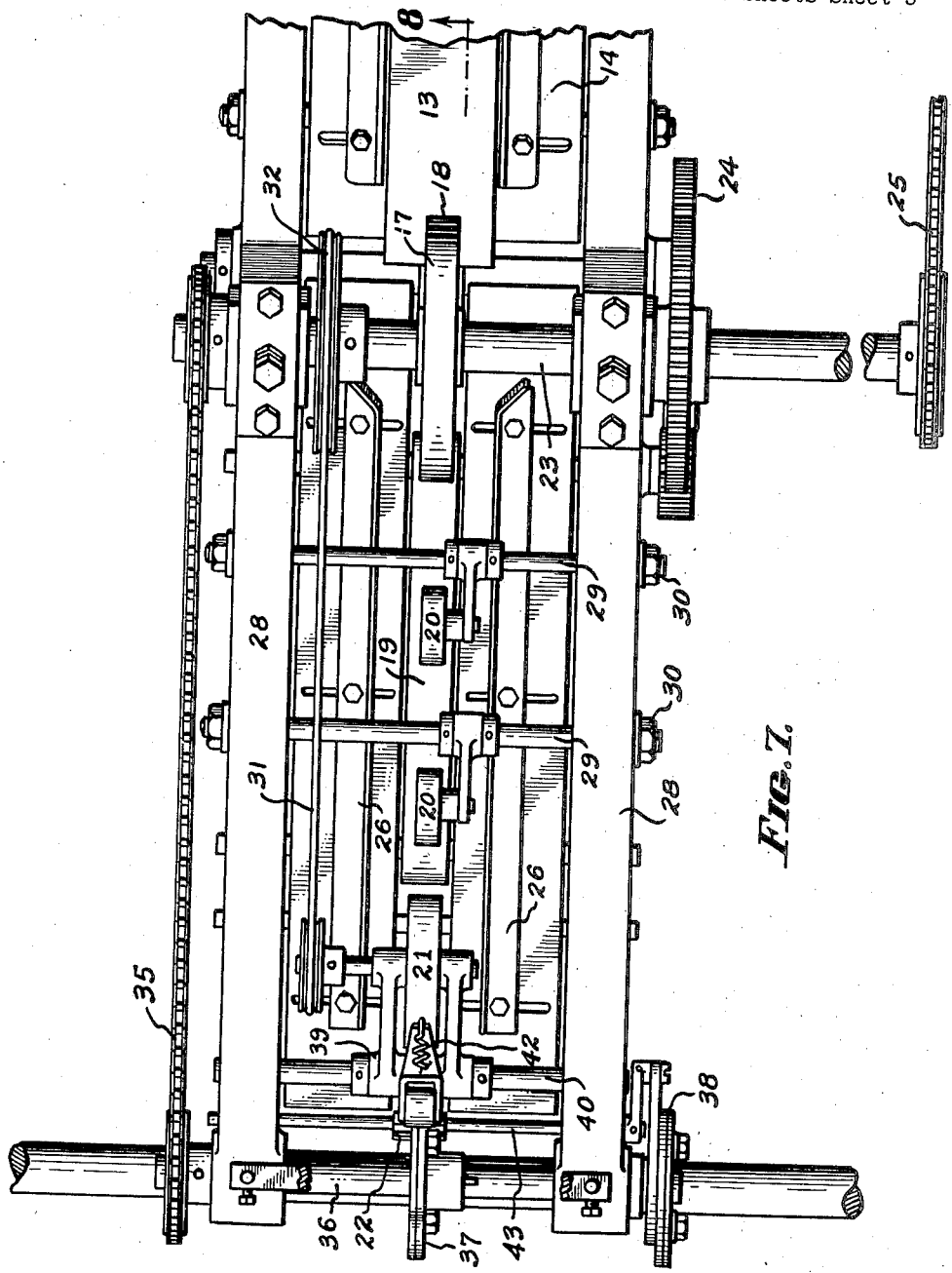

Fig. 7 is an enlarged plan view of the strip feeding mechanism.

Fig. 8 is a fragmentary section taken along the line 8—8 of Fig. 7 showing the strip-feeding mechanism in its detailed relation to the box-blank conveyor.

Fig. 9 is a fragmentary view illustrating the operation of a timed feed wheel.

Figure 10:
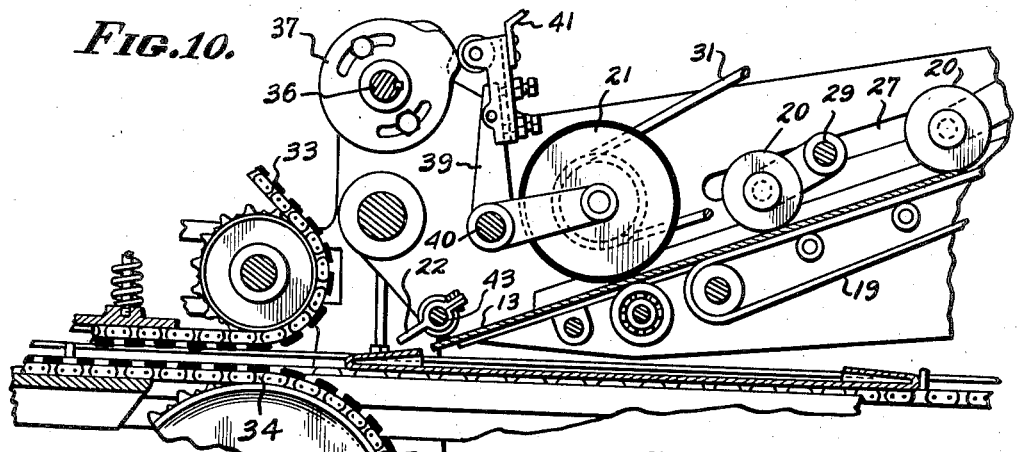
Figure 11:
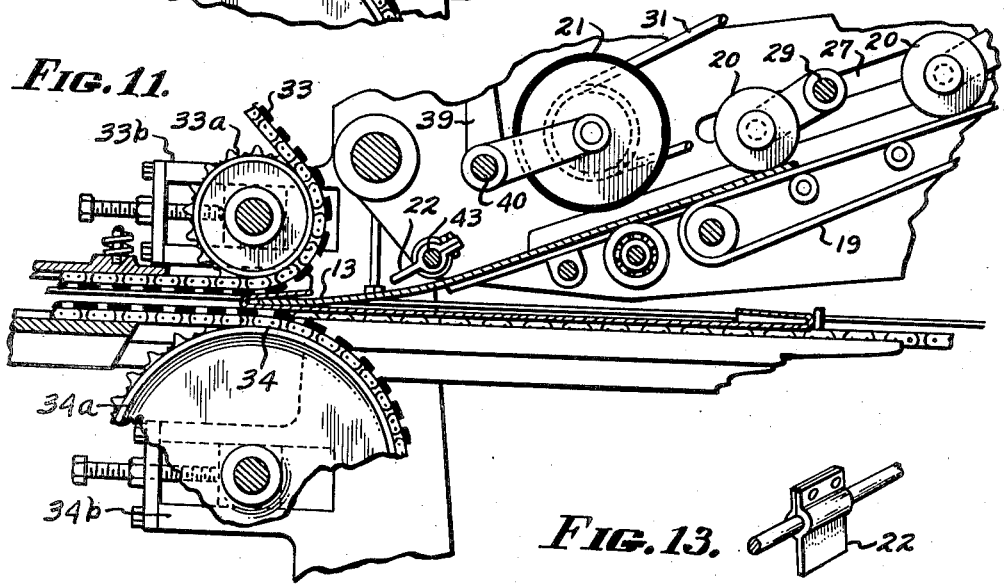

Figs. 10 and 11 illustrate operations of the strip-feeding mechanism.

Figure 12:
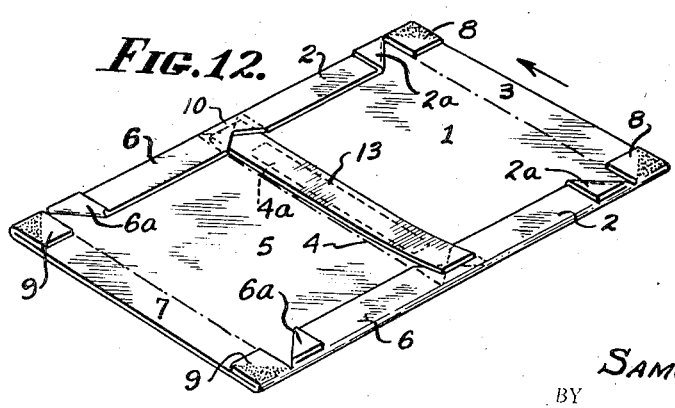

Fig. 12 is a perspective of a box blank after it has just passed the strip-feeding mechanism.

Figure 13:
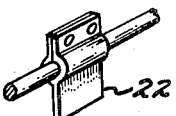

Fig. 13 is a perspective of a stop member used in the strip-feeding device.

Figure 14:
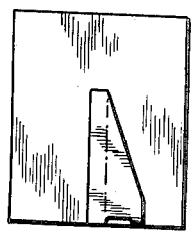

Fig. 14 shows another utility of the strip feeding mechanism, as applying an easel to the rear of a display card.

Referring now to the drawings, Figure 1a illustrates my preferred form of blank, prior to the folding and gluing of the blank and prior to the application of the reinforcing strip. This shows a box blank having a main bottom panel 1, having side panels 2, 2, a wall 3 which for convenience will be called a front wall, and a wall 4 which for convenience will be called a back wall. Articulated to this back wall is the main body panel 5 of the lid, said lid having side walls 6, 6 and a lid front wall 7.

Extending laterally from the front wall panel of the box bottom portion are the corner sustaining flaps 8, 8, and like corner sustaining flaps 9, 9 extend laterally from the lid front wall panel. The side panels 2, 2 have diagonally scored portions 2a, and the side panels 6, 6 have like portions 6a, 6a.

Between the side wall panels of the lid and bottom portions of the blank are intermediate corner connecting sections having diagonal lines of fold therein. They may be described as having a median portion 10, with triangular sections 11, 11 and 12, 12 articulated by diagonal fold lines to the median portion and to the respective side walls by a fold line normal to their length.

The successive stages of folding as illustrated in 1a, 1b, 1c, 1d, and 1f are as carried out by my co-pending application and patents previously referred to in which flaps 2a and 6a are primarily turned under, then the entire side walls turned over, with change of direction of the blank, then adhesive applied and then the sides folded over. However, in my present invention, stage 1d, the adhesive is also applied to the back wall as illustrated at 4a. The next step shows the reinforcing strip 13 in position on the interior surface of the back wall, so that the pressure which is subsequently applied to secure adhesion between the diagonally scored portions 2a and the corner sustaining flaps 8, 8 also secures adhesion between the reinforcing strip and the rear wall 4, the completed box in knocked-down collapsed form ready for shipment thereby appearing as illustrated in my preformed form in Fig. 1. It will be noted that the one end of the strip 13 underlies the portions 10, 11 and 12 of the advancing end of the blank and overlies the like portions at the trailing end of the blank.

Fig. 2 illustrates my preferred form of box as shown in Fig. 1, in partly erected condition. As the side-walls 2, 2 are raised, the intermediate corner connecting section as well as the side walls of the lid, 6, 6 are also brought into upright position, and the raising of these side walls simultaneously causes the corner sustaining flaps 8, 8, and 9, 9, to swing into position against the main bottom and top panels of the box, as illustrated, serving to retain the box in upright position. As the intermediate corner connecting sections are raised, the portion of the reinforcing strip which in flat form has been overlying one of the corner connecting sections as illustrated, drops down into position against the rear wall.

Fig. 3 illustrates the box shown in Fig. 2 with the lid brought down into final closing position, and because of the reinforcing strip on the back wall the finished box with the lid in position as illustrated is now supported both on the sides and at the front and back by two layers or thicknesses of board, in addition to the extra reinforcement given at the corner sections by the corner sustaining flaps, providing a box of an unusually substantial nature and a box that is well adapted to shipping and storing of various articles.

Fig. 4 illustrates an alternate style of box in which the corners are secured without corner sustaining flaps. This is an alternate type of knocked-down construction, and Figs. 4a, 4b, 4c, and 4d, illustrate successive steps of folding and gluing of this box, illustrating in stages 4c, 4d the application of the reinforcing strip according to my method, the finished box in knocked-down form all ready for shipment, with the reinforcing strip adhered to the back wall, being illustrated in Fig. 4. In this blank the tabs 8 and 9 instead of being on the end walls are articulated to the triangular corners on the side walls, which have been indicated at 2b and 2c and the tabs as 8a and 9a. The stages are first to turn the flaps 8a, 2b and the flaps 9a, 2c, then apply adhesive, then apply the reinforcing strip 13 and turn in the end walls 3 and 7.

My preferred mechanism for applying the strip 13 includes a hopper 14 in which a number of cut-to-size strips 13 of desired proportions, according to the blanks to which they are to be applied, are placed in staggered or offset position. There is a continuously revolving primary underneath feed wheel 15, a frictional retard strip 16 and a primary overhead feed wheel 17, there being located on the circumference thereof a frictionally surfaced feed pad 18. There is a continuously moving underneath feed belt 19, adjustable overhead idler rollers 20, a secondary feed wheel 21 which has a frictional surface around its circumference, and a stop 22. The mechanism imparts a timed intermittent action to parts 21 and 22.

Fig. 8 illustrates the parts 21 and 22 in off position. Fig. 10 shows them in on position. Fig. 11 shows part 21 off, but the stop 22 still in released position.

The shaft 23 on which the primary overhead feed wheel is located, is driven by a gear 24 and chain 25 to a shaft of the folding and gluing machine with which my strip-feeding mechanism is operating in conjunction. The ratio is such that the primary overhead feed wheel makes one timed revolution for each blank that comes from the gluing machine, from which it is driven, so that in this manner for every blank that advances through the folding and gluing machine, one strip is fed out by the strip-feeding mechanism, due to the fact that the frictionally surfaced pad located on the circumference of the primary overhead feed wheel, engages the uppermost of the series of strips in the hopper, bringing it forward between said pad and the continuously revolving primary underneath feed wheel. The retard, which can be of rubber or other suitable material, prevents more than one strip being brought forward at a time.

The gear 24 drives the conveyor belt 19 and as the strip is drawn forward in the manner described, this continuously moving underneath feed belt continues to carry the strip forward to the position illustrated in Fig. 8. There are adjustable side guides 26, serving to align or guide the strip as it is fed forward, which can be suitably spaced depending upon the width of the strip, providing a ready means for changing from one width to another, and the side boards on the hopper will also be adjustable similarly, to provide for strips of different widths.

The overhead idler rollers 20 are adjustable in slots 27 in the side frames 28 of the feed mechanism, these rollers serving to keep the strip in contact with the continuously moving underneath feed belt. These idler rollers can therefore be adjusted as desired depending upon the length of the strip, and if desired, can be made inoperative by being swung upwardly, or completely removed. These movements are accomplished by tightening or loosening the shafts 29 on which the roller arms are mounted, by means of nuts 30.

By this means the strip is fed forward to meet the stop 22, and as illustrated when the stop is in position to prevent the strip from moving past said stop, the continuously moving secondary overhead feed wheel is inoperative, due to the fact that it is lifted above the surface of the strip. When the advancing folded blank has reached the proper position, the stop now lifts so that strip can be fed forward, and simultaneously the secondary overhead feed wheel comes down into operative position, to feed the strip forward.

The secondary overhead feed wheel 21 is driven by a belt 31 from a pulley 32 on the driven shaft of the primary overhead feed wheel. By the relative pulley sizes, the secondary feed wheel is preferably made to revolve at a slightly greater speed than the primary overhead feed wheel. The purpose of this is to feed the strip forward, when it is engaged by the secondary overhead feed wheel, at a slightly faster rate than the folded blank is advancing on the gluing machine. The effect of this slightly higher rate in feeding forward the strip permits the forward end of the strip to push its way under the folded corner connecting section of the blank, as illustrated in Fig. 1e, and thereupon a pair of conveyors 33 and 34 of the final folding mechanism press down upon the corner connecting section, serving to grip the forward edge of the reinforcing strip between the corner connecting section and the back wall as the blank is fed along; and as explained in my application Serial No. 129,900, these conveyors are timed with the blank feeding mechanism. At the time when this action takes effect, the secondary feed wheel has again become inoperative by being lifted from surface contact with the reinforcing strip (Fig. 11), so that the advancing motion of the blank thereby serves to withdraw the strip completely from the strip-feeding mechanism, the forward edge being engaged between the forward corner connecting section and the rear wall of the advancing blank, the rearward edge of the strip falling into position over the rearward corner connecting section of the moving blank.

It should be noted that adjustment is provided for the position of the initial contact point of the feed belts 33 and 34 by arranging the guide rolls 33a and 34a with slotted supports 33b and 34b. The reason for this is that it is necessary, when feeding strips onto a blank in which the advancing corner-connecting section has been previously folded in over the rear wall, to vary the distance which the secondary feed-wheel feeds the strip, depending on the depth of the walls of the blank. That is, when the walls are relatively deep, it is necessary for the secondary feed-wheel (which as explained before is traveling at a rate of speed exceeding the rate of travel of the blank) to feed the strip further forward, in order to push it the proper distance beneath the infolded corner section, than is the case when the walls are relatively shallow. For this reason, it is necessary to be able to adjust the distance between the strip feeding means and the initial point of squeeze, and while this could be accomplished by making the entire strip-feeding unit adjustable backward or forward along the line of travel of the blanks, and having the initial point of squeeze fixed, I prefer to accomplish the result by the means just explained.

As the blank continues to advance, the strip is retained in its predetermined portion by the pressure of the underneath moving belt 34 and the moving overhead belt 33. The final step is now to transfer the blank with superposed strip, on to a pressure means, to secure adhesion. The customary transfer means consists of two moving belts, as illustrated at 34m and 34n, acting on the two outward edges of the blank. However, I have found that during the transfer of the blank the strip is very likely to slip from its position, since the adhesive has not as yet become sufficiently dry to cause firm adherence, and I therefore may provide an additional overhead transfer belt 34x and an underneath moving belt 34y which are so placed as to bear on the strip as the transfer is effected, and thereby retain it in position.

The customary pressure means consist of the wide underneath belt, 34d, and two narrower weighted overhead belts 34e and 34f which serve to press the outer edges of the folded blank to secure adhesion between the corner portions thereof. Said belts travel at a rate much less than the previous rate of travel of the blanks in the machine, so that the blanks are stacked in a fanned out position between the pressure belts and have sufficient length of time for the adhesive to become set.

To assure the strip retaining its desired position, and to provide more positive pressure to cause adhesion between the strip and panel, I have provided an additional overhead weighted pressure belt 34g centered between the other two, which bears upon the superposed strips. However, when folded boxes are stacked in fanned-out or offset relation, the pressure tends to concentrate on the portions of maximum thickness, which in the case of my preferred box for example, is at the corners. This naturally lessens the pressure I desire to secure the adhesion of the strip, so that I have further provided a raised shoulder as at 34h under the bottom pressure belt, to compensate for the thickness of the stacked blanks which at this portion will not be as great as the thickness at the corners.

The timing of the secondary feed wheel is accomplished as follows: A chain 35 is driven with the shaft for the underneath conveyor as illustrated in Fig. 7, which chain drives the cam shaft 36, that has the feed wheel cam 37 thereon as well as the cam 38 for the stop 22. The secondary feed wheel spindle is mounted to revolve in a trunnion which is at one end of a bell crank 39 supported on a suitable cross shaft 40. The upper end of the bell crank has a cam follower roller thereon which engages the cam 37. An arm 41 with a spring 42 restraining its movement holds the roller against the cam.

The stop finger 22 is mounted fast on a cross shaft 43, which as shown in Figs. 6 and 7 has a bell crank on its outer end with a cam follower roller 44 on its outer end. This follower rides on the cam 38 and is held against it by a spring 45 that engages the bell crank.

The timing of the delivery mechanism for the strips can be brought to complete accuracy with blank movement due to the common drive for all parts of the mechanism emanating from a single source and having chain and gear connection, as is familiar practice in box making machinery, where timing is required. Thus looking at Fig. 8, when a conveyor feed pin 46 on the main blank conveyor mechanism 47 comes to a certain position, the cams operate, release a strip from the stopped position and thrust it downwardly and forwardly against the blank at a more rapid rate than the blank is moving. As soon as the blank is gripped by the following conveyor chains (or it might be a pair of squeeze rolls) the secondary feed roller is lifted so that the reinforcing strip comes out of the feed device as a result of being pulled along with the blank.

It can readily be seen that my preferred mechanism as above described, provides a very simple and efficient mechanism, readily adjustable to different sized strips that may be required, which operates in a simple and positive manner to feed reinforcing strips forward in timed relation to moving box blanks as they are conveyed along, and to deposit the strip in a desired position on the moving blank. The blanks themselves are not disturbed or retarded in any way from their normal flow on a gluing and folding mechanism, with no additional manufacturing cost for providing the reinforced type box by my method, as compared to the folding and gluing machine operations in making folded and glued boxes of the type described without the reinforcing strip.

Referring to the above description again for the moment, it should be pointed out that it is preferable to feed the advancing edge of the strip under the infolded corner connecting section and the back wall, as explained in some detail above, merely for the purpose of making the stacking of the boxes in the pressure belts more simple. Without the edge of the advancing strip in between the reinforcing section and the rear wall, there might be some problem of the forward edges of the reinforcing strips catching on the succeeding blanks as the blanks are continuously fed in between the pressure belts, which is not the case if done as described above. The trailing edges of the reinforcing strip readily overlie the rear corner connecting section, without tending to cause any difficulty in the stacking of the blanks between the pressure belts.

The alternate style of box shown in Fig. 4 and Figs. 4a, b, c, the successive stages in the manufacture of this box, can be carried out by folding and gluing mechanism in wide use and by the addition of an extra glue-applying means, and my strip-feeding mechanism incorporated as described above, the middle wall can be reinforced as illustrated. In the manufacture of this box, the blank travels only in one direction of motion, and the blanks are fed out one at a time, in the direction indicated by the arrow in the drawings. Glue is applied by a timed gluer in the usual way to the glue flaps and to the corresponding portions of the end walls, and glue is also applied to the rear wall as illustrated at 4a (Fig. 4c). Immediately following the adhesive application, reinforcing strips are fed out into overlying position with the rear wall, by my mechanism as described above, connected of course to operate in timed relationship with the moving blank, but this time at the same delivery speed as that of the main blank conveyors. Thereafter the blanks are fed between timed conveyor belts for pressure, as illustrated, to secure adhesion between the reinforcing strip and the rear wall, and also to secure adhesion between the glue flaps and the end walls. The completed knocked-down box ready for shipment as shown in Fig. 4, can be erected or squared up into position for filling with contents and closing by bringing the lid into position; however, since this type of box does not have the corner sustaining flaps it is somewhat more difficult to assemble than my preferred style, and does not make as square or rigid a package in finished form. It should be pointed out in connection with this alternate description as just given that the corner connecting sections are not folded inwardly, so that the advancing edge of the strip cannot be engaged between the folded corner connecting section and the rear wall, but the timed conveyor belts (Fig. 5a) would operate to hold the forward edge of the reinforcing strip in position and draw it forward from the strip-feeding mechanism, and by using an adhesive which sets quickly the forward edge could be held down enough in position so that by the time the blank is released into the conveyor belts for pressure, it will tend to remain down, and with the proper precaution can be stacked in the pressure belt satisfactorily.

In the description above the adhesive which is to secure the strip to the rear wall has been noted as being applied to the rear wall, but it is obvious that if desired a glue applying means could be used to apply adhesive to the under side of the strip as it was fed, and still other forms of causing adhesion are possible, such as having strips pre-coated with dry gum which could be moistened as the strips are fed out, or the strip or the back wall of the box could be coated with a dried thermoplastic coating and run between heated rolls pressing the rear wall against the strip thereafter, and my invention contemplates all these forms and others that might exist for introducing an adhesive bond.

It is also obvious that portions of the intermediate corner connecting sections could be glued to the rear wall of the box as described in my copending application, Serial No. 167,788, in which event, however, the reinforcing strip could not project to the line of fold defining the intermediate corner connecting sections, and the edge of the strip would be placed between the edges of the glued portions of the corner connecting sections.

Fig. 5 and Fig. 5a show the mechanism for making the box of Fig. 1. The unit for accomplishing the operation of stage 1b, and 1c, are shown at 50 and 51 respectively (the application Serial No. 129,900 filed March 9, 1937, is referred to for complete description). The feed rolls 52 deliver the blanks to conveyor 53, which as shown in Fig. 5a carries the blanks through the gluer 54, to the strip reinforcer and thence to the folder 55, the pressure conveyor elements of this folder having already been noted. The stacker 56 then receives the blank.

Fig. 4e shows the arrangement for making the box of Fig. 4 and Figs. 4a to 4d. The corner folders 57 bring the blank to the form in Fig. 4b. The glue applier 58 then applies adhesive. Then comes the reinforcer as described, and finally the side folder 59 with its pressure conveyor device and the stacker 60.

Various modifications of my essential method and mechanism should be readily apparent to those skilled in the art, and it should be understood that I do not wish to be confined to the particular forms illustrated herein, and that what I claim as new and novel and desire to secure by Letters Patent is as follows:—

1. A method of reinforcing a wall of a one-piece box which consists in moving said box in direction of motion parallel to said wall, moving a separate strip of semi-rigid material in same direction of motion, and depositing said strip in predetermined position on said wall while both are moving, adhesive having been applied between meeting surfaces of said wall and strip, and thereafter engaging said strip in timed relation to further motion of said blank, to retain said predetermined position.

2. A method of reinforcing a wall of a one-piece box which consists in moving said box in direction of motion parallel to said wall, moving a separate strip of semi-rigid material in same direction of motion, and depositing said strip in predetermined position on said wall while both are moving, adhesive having been applied between meeting surfaces of said wall and strip, thereafter engaging said strip in timed relation to further motion of said blank, to retain said predetermined position, and transferring said blank to apply pressure to effect adhesion, while further effecting engagement between said strip and wall, during course of transfer, to retain predetermined position.

3. A method of making one-piece boxes in knocked down form which comprises providing a prepared blank having a bottom panel and lid panel, both of which panels have a front wall and side walls articulated thereto, the lid panel being foldably connected to the rear wall of the bottom, moving said blank along and folding the walls, adhesively securing flaps articulated to one pair of opposite walls to the remaining pair of opposite walls, and applying a reinforcing strip of semi-rigid material to said rear wall, while the blank is in motion.

4. A method of making one-piece boxes in knocked down form which comprises providing a prepared blank having a bottom panel and lid panel, both of which panels have a front wall and side walls articulated thereto, the lid panel being foldably connected to the rear wall of the bottom, moving said blank along and folding the walls, adhesively securing flaps articulated to one pair of opposite walls to the remaining pair of opposite walls, and applying a reinforcing strip of semi-rigid material to said rear wall, while the blank is in motion in direction of motion parallel said wall.

5. A method of making one-piece boxes in knocked down form which comprises providing a prepared blank having a bottom panel and lid panel, both of which panels have a front wall and side walls articulated thereto, the lid panel being foldably connected to the rear wall of the bottom, moving said blank along and folding the walls, adhesively securing flaps articulated to one pair of opposite walls to the remaining pair of opposite walls, and applying a reinforcing strip of semi-rigid material to said rear wall, while the blank is in motion in direction of motion parallel said wall, and thereafter applying pressure to secure adhesion.

6. A method of making one-piece boxes in knocked-down form with lid attached, which consists of moving a cut and creased blank having a main bottom panel, with a front wall, rear wall, and two side walls articulated thereto, and to which rear wall is articulated a lid panel having a front wall and two side walls, and as the blank is moved along adhesively joining the walls at the four outer corners and also adhesively combining to said rear wall a separate strip of reinforcing material, pressure being applied thereafter to secure adhesion.

7. That method of forming a reinforced back wall one-piece box which consists in moving a blank for such box laterally so that said back wall extends in the direction of motion, said blank having infolded-wise walls overlying the blank bottom, intermittently feeding, in timed relation to said blank movement, a reinforcing strip to face said back wall, bringing the strip into superposition over the back wall while both are moving, and as a part of said step inserting the advancing end of the strip between the infolded side wall and the bottom of the blank, and applying pressure to secure the strip in place, adhesive having been supplied between it and said back wall.

8. A device for applying a reinforcing strip to the back wall of a one piece box during the operation of folding and adhesively securing the wall forming panels of said blank, comprising means for intermittently feeding the reinforcing strips in the general direction and in time with box blank movement into superposed position over said back wall, said intermittent feed being at a more rapid rate than that of the blank movement whereby the advancing end of the strip is caused to move beneath a previously folded wall forming panel on the moving blank, and moving pressure applying means arranged to immediately engage said blank.

9. A device for applying a reinforcing strip to a wall of a box blank comprising a means for feeding strips singly in timed relation from a supply, means for arresting the motion of said strips, additional feeding means for advancing strips from their arrested position, and means timed with blank movement for intermittently putting into operation said arresting and additional feeding means.

10. A device for applying a reinforcing strip to a wall of a box blank comprising a means for feeding strips singly in timed relation from a supply, means for arresting the motion of said strips, additional feeding means for advancing strips from their arrested position, and means timed with blank movement for intermittently putting into operation said arresting and additional feeding means, said additional feeding means operating at a speed greater than that of the blanks to which the strips are to be delivered.

11. A device for applying a reinforcing strip to a wall of a box blank comprising a means for feeding strips singly in timed relation from a supply, means for arresting the motion of said strips, additional feeding means for advancing strips from their arrested position, and means timed with blank movement for intermittently putting into operation said arresting and additional feeding means, said means arranged to discontinue the operation of the additional feeding means during the latter part of the period when the arresting means is in non-arresting position.

12. A device for applying a reinforcing strip to a wall of a box blank comprising a means for feeding strips singly in timed relation from a supply, means for arresting the motion of said strips, additional feeding means for advancing strips from their arrested position, and means timed with blank movement for intermittently putting into operation said arresting and additional feeding means, and timed pressure means to effect engagement between the advancing end of the strip and said wall as the strip is advanced.

13. A device for applying a reinforcing strip to a wall of a box blank comprising a means for feeding strips singly in timed relation from a supply, means for arresting the motion of said strips, additional feeding means for advancing strips from their arrested position, and means timed with blank movement for intermittently putting into operation said arresting and additional feeding means, said additional feeding means operating at a speed greater than that of the blanks to which the strips are to be delivered, said means arranged to discontinue the operation of the additional feeding means during the latter part of the period when the arresting means is in non-arresting position.

14. In combination a device for conveying box blanks having each a bottom section and a top section connected by a wall, means for deposition on said wall of said blanks in timed relation and prearranged position, a strip of reinforcing material, means for applying adhesive between the strip and the said wall, and moving means engaging the strip during its deposition synchronized to the conveying means to retain said prearranged position.

15. In combination a feed device for feeding box blanks having each a bottom section and a top section connected by a wall, means for deposition on said wall of said blanks in timed relation and prearranged position, a strip of reinforcing material, means for applying adhesive between the strip and the said wall, and means moving with the blank for applying pressure to the deposited strip, said strip delivering means arranged to initially deposit the strip on the blank at a higher speed than that of the blank movement, whereby a reverse turned wall on said box will act as a stop to locate the advance position of the strip.

16. In combination a feed device for feeding box blanks having each a bottom section and a top section connected by a wall, means for deposition on said wall of said blanks in timed relation and prearranged position, a strip of reinforcing material, means for applying adhesive between the strip and the said wall, and means moving with the blank for applying pressure to the deposited strip, said strip delivering means arranged to initially deposit the strip on the blank at a higher speed than that of the blank movement, whereby a reverse turned wall on said box will act as a stop to locate the advance position of the strip, and means moving with the blank to apply pressure over the said wall portion to cause adherence without slippage of said reinforcing strip.

17. A method of making reinforced one-piece boxes consisting in moving box blanks singly, moving semi-rigid strips in timed relation therewith, depositing said strips on a wall of said blank, adhesive having been applied between meeting surfaces of said strip and wall, and retaining predetermined relationship therebetween as said blanks are transferred into fanned-out position in a pressure arrangement traveling at slower speed than previous rate of travel of said blanks, said pressure arrangement applying localized pressure on strip and wall to secure adhesion, irrespective of additional thickness of other folded portions of blank.

18. A method of reinforcing walls of knocked-down boxes consisting in moving box blanks, in moving reinforcing strips in timed relation with said box blank movement, and while moving causing adhesive to be applied therebetween and thereafter deposit said strip upon a wall of said box-blank and moving said box blanks with the reinforcing strip on said wall, and retaining said strip on said wall, with adhesive therebetween by moving pressure means localized in engagement to said strip, which are coordinated with movement of said blank.

19. A device for applying a reinforcing strip to the back wall of a one piece box during the operation of folding and adhesively securing the wall forming panels of said blank, comprising means for intermittently feeding the reinforcing strips in the general direction and in time with box blank movement into superposed position over said back wall, said intermittent feed being at a more rapid rate than that of the blank movement whereby the advancing end of the strip is caused to move beneath a previously folded wall forming panel on the moving blank, moving pressure applying means rranged to immediately engage said blank, and means for adjusting the spacing between the intermittent feeding means and the pressure means.

20. In combination a feed device for feeding box blanks having each a bottom section and a top section connected by a wall, means for deposition on said wall of said blanks in timed relation and prearranged position, a strip of reinforcing material, means for applying adhesive between the strip and the said wall, means moving with the blank for applying pressure to the deposited strip, and means for adjusting the point of application of the pressure applying means with respect to the advancing end of said strip.

21. A device for applying a reinforcing strip to the back wall of a one piece box during the operation of folding and adhesively securing the wall forming panels of said blank, comprising means for intermittently feeding the reinforcing strips in the general direction and in time with box blank movement into superposed position over said back wall, said intermittent feed being at a more rapid rate than that of the blank movement whereby the advancing end of the strip is caused to move beneath a previously folded wall forming panel on the moving blank, moving pressure applying means arranged to immediately engage said blank, a stacking conveyor, and means forming part thereof to apply localized pressure to the reinforcing strip.

22. A device for applying a reinforcing strip to the back wall of a one piece box during the operation of folding and adhesively securing the wall forming panels of said blank, comprising means for intermittently feeding the reinforcing strips in the general direction and in time with box blank movement into superposed position over said back wall, said intermittent feed being at a more rapid rate than that of the blank movement whereby the advancing end of the strip is caused to move beneath a previously folded wall forming panel on the moving blank, moving pressure applying means arranged to immediately engage said blank, a stacking conveyor, and means forming part thereof to apply localized pressure to the reinforcing strip, said means comprising an upper belt, a lower belt and a raised support, localized to the reinforcing strip zone for the lower belt.

23. A device for applying a reinforcing strip to the back wall of a one piece box during the operation of folding and adhesively securing the wall forming panels of said blank, comprising means for intermittently feeding the reinforcing strips in the general direction and in time with box blank movement into superposed position over said back wall, said intermittent feed being at a more rapid rate than that of the blank movement whereby the advancing end of the strip is caused to move beneath a previously folded wall forming panel on the moving blank, moving pressure applying means arranged to immediately engage said blank, and means for stacking the completed articles, said pressure applying means including members localized to the reinforcing strip zone.

24. A device for applying a reinforcing strip to the back wall of a one piece box during the operation of folding and adhesively securing the wall forming panels of said blank, comprising means for intermittently feeding the reinforcing strips in the general direction and in time with box blank movement into superposed position over said back wall, said intermittent feed being at a more rapid rate than that of the blank movement whereby the advancing end of the strip is caused to move beneath a previously folded wall forming panel on the moving blank, moving pressure applying means arranged to immediately engage said blank, means for stacking the completed articles, said pressure applying means including members localized to the reinforcing strip zone, and including two sets of moving belts each set engaging the blank above and below, one set to carry the blank through a final folding stage and one to deliver it to a stacking conveyor.

25. A device for applying a reinforcing strip to a wall of a box blank comprising a means for feeding strips singly in timed relation from a supply, means for arresting the motion of said strips, additional feeding means for advancing strips from their arrested position, and means timed with blank movement for intermittently putting into operation said arresting and additional feeding means, a stacking conveyor, and pressure belts engaging the blank at one area localized to the reinforcing strip zone and moving with the blank, and a stacking conveyor, said pressure belts serving to deliver the blank to the stacking conveyor, the stacking conveyor including moving pressure applying means also localized to said zone, to assure adhesion between said wall and strip, irrespective of greater thickness of other folded portions of blank.

26. In a machine of the character described, means for conveying a one-piece box blank, means for depositing a reinforcing strip upon the rear wall of said blank in predetermined position, adhesive having been applied between meeting surfaces of said wall and strip, and moving means engaging the strip only, and synchronized to the moving means conveying the blank, to retain said predetermined position.

27. In a machine of the character described, means for conveying a one-piece box blank, means for depositing a reinforcing strip upon the rear wall of said blank in predetermined position, adhesive having been applied between meeting surfaces of said wall and strip, and moving means engaging the strip synchronized to moving means conveying the blank, to retain said predetermined position, and means to transfer said blank with superimposed strip from said conveying means to a stacking conveyor, said transfer means including moving means engaging said strip and coordinated moving means engaging said wall, to retain predetermined position therebetween during course of said transfer.

28. In a machine of the character described, means for conveying a one-piece box blank, means for depositing a reinforcing strip upon the rear wall of said blank in predetermined position, adhesive having been applied between meeting surfaces of said wall and strip, and moving means engaging the strip synchronized to the means conveying the blank, to retain said predetermined position, and means to transfer said blank with superimposed strip from said conveying means to a stacking conveyor, said transfer means including moving means engaging said strip and coordinated moving means engaging said wall, to retain the predetermined position therebetween during course of said transfer and said stacking conveyor having localized means pressing against said wall and strip to secure adhesion therebetween, irrespective of additional thickness of other folded portions of blank.

SAMUEL BERGSTEIN.